June 17, 1958     J. W. HILL     2,839,320
PIPE CONNECTORS
Filed Dec. 7, 1954     3 Sheets-Sheet 1
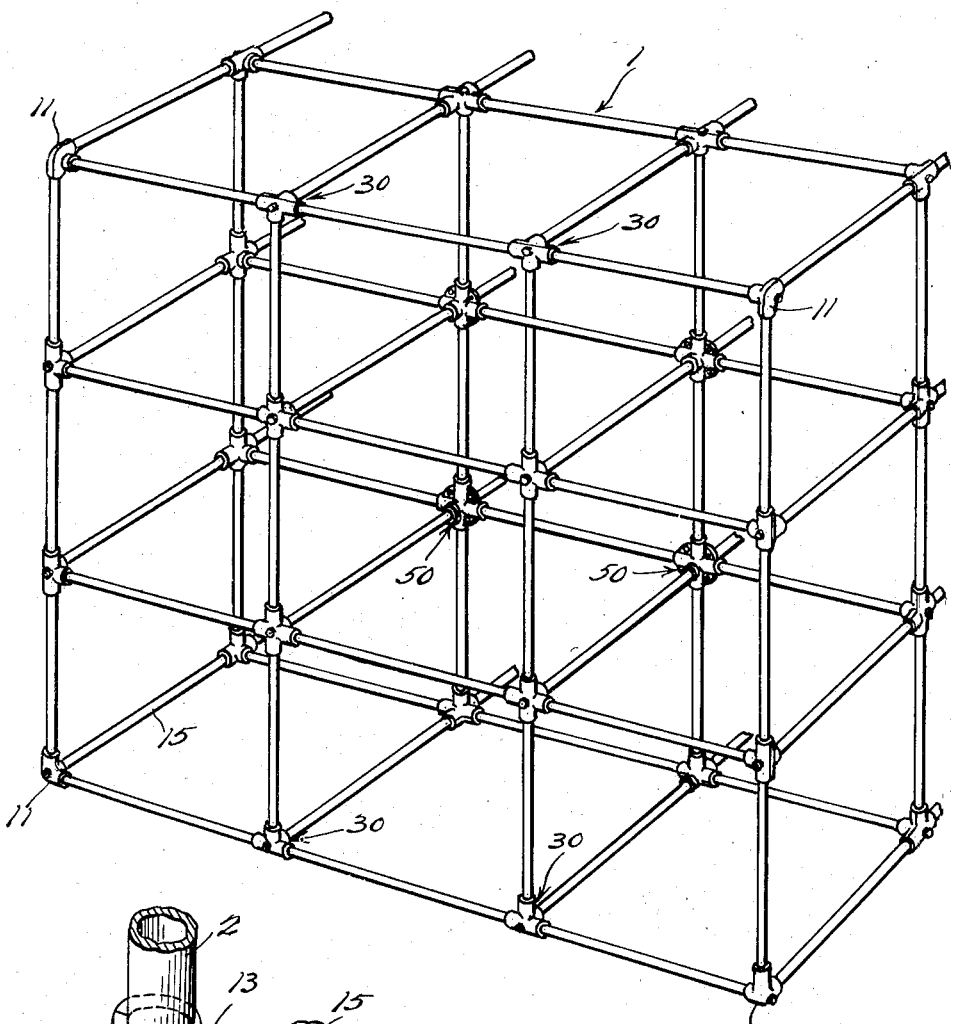
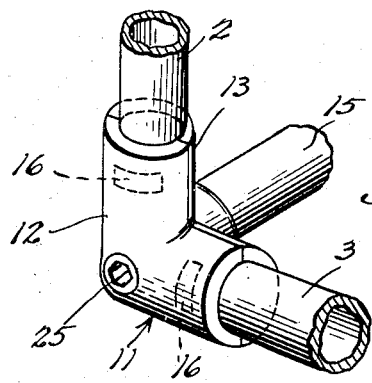
INVENTOR.
John W. Hill.

June 17, 1958   J. W. HILL   2,839,320
PIPE CONNECTORS
Filed Dec. 7, 1954   3 Sheets-Sheet 2
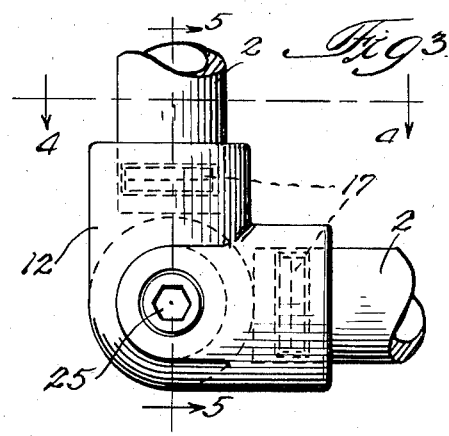
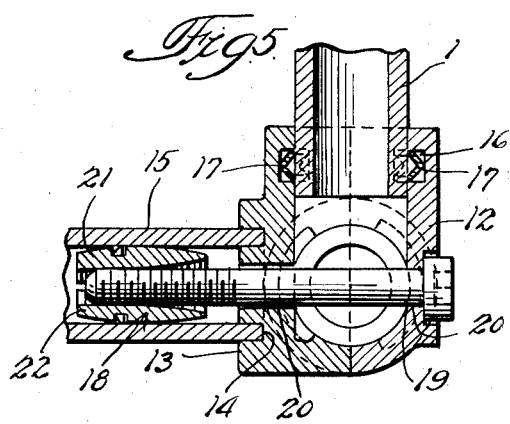
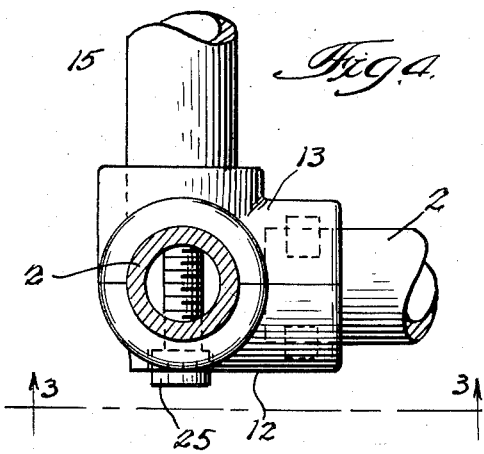
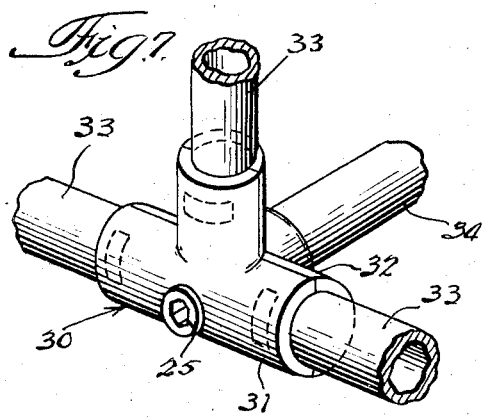
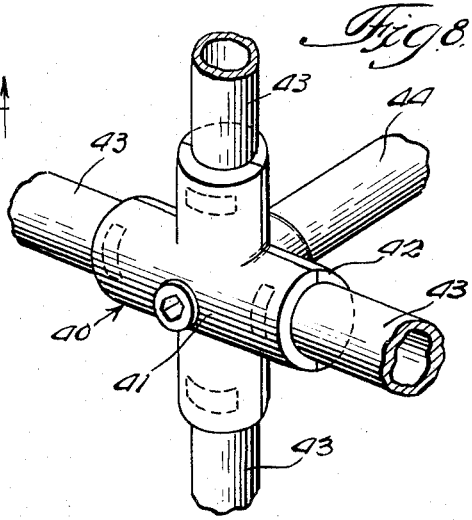
INVENTOR.
John W. Hill June 17, 1958     J. W. HILL     2,839,320
PIPE CONNECTORS
Filed Dec. 7, 1954     3 Sheets-Sheet 3
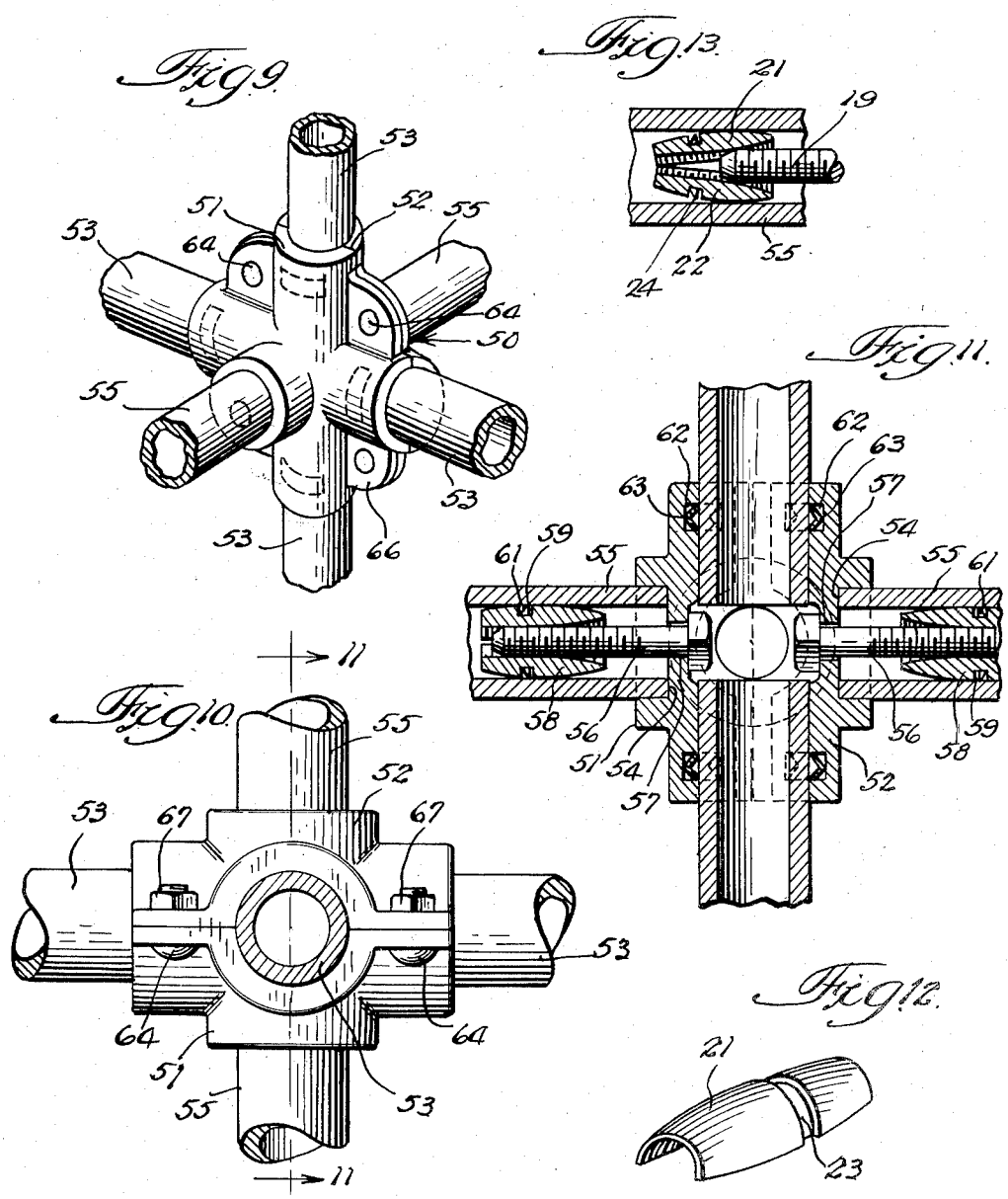
INVENTOR.
John W. Hill.

United States Patent Office 2,839,320
Patented June 17, 1958

2,839,320

PIPE CONNECTORS

John W. Hill, Chicago, Ill., assignor to The Globe Company, Chicago, Ill., a corporation of Illinois Application December 7, 1954, Serial No. 473,558

11 Claims. (Cl. 287—54)

The present invention relates to pipe connectors and has special reference to connectors for joining the ends of unthreaded pipe sections to form stands, racks, guard rails and other constructions.

More particularly, this invention relates to pipe connectors for detachably connecting the adjacent ends of two or more unthreaded pipes rapidly and with a minimum of effort.

The present pipe connectors comprise two separable members or half clamps for engaging opposite sides of a number of pipes and fixedly clamping them therebetween, and a separate securing member such as a bolt, which passes from the outer side of one of said separable members through both members and into an anchor member positioned in the abutting end of an anchor pipe engaging the outer side of the other separable member.

The clamping members have recesses in their inner walls with inserts positioned therein which engage the ends of the junctioning pipes located between the clamping members and hold them fixedly in place.

Additional securing members are required where, in addition to the pipes clamped between the opposed clamping members, there are two anchor pipes which extend in generally opposite directions. In such connectors, which are used where the connector is spaced interiorly from all sides of the rack or other construction, additional bolts are required for securing the two clamping members together as well as two securing members for anchoring the end of each of the oppositely extending anchor pipes to its adjacent clamping member.

The present invention permits the rapid, easy and inexpensive assembly of a great many different types of racks and other constructions from unthreaded pipe sections, and a few types of connectors.

An object of this invention is to provide a pipe connector for connecting the juncturing ends of a plurality of pipe sections.

Another object is to provide such pipe connectors which will fixedly hold the pipe ends in position.

Still another object is to provide pipe connectors of the above type which may be rapidly and easily secured to the pipes.

A still further object is to provide pipe connectors that may be employed to form an unlimited number of constructions from pipe sections.

An additional object is to provide such pipe connectors that require little space and do not extend substantial distances along the joined pipes.

Further objects and advantages will be apparent from the following description and claims when considered with the accompanying drawing in which—

Figure 1 is a perspective view of a rack formed of pipe sections secured together by pipe connectors embodying the present invention;

Fig. 2 is a perspective view of a corner construction of the rack shown in Fig. 1 consisting of a connector joining a plurality of pipe ends;

Fig. 3 is a side elevational view of the construction shown in Fig. 2;

Fig. 4 is a top plan view of the construction shown in Fig. 3, looking in the direction of the arrows 4—4 thereof;

Fig. 5 is a cross-sectional view taken on the line 5—5 of Fig. 3;

Fig. 6 is a perspective view of a clamping insert employed in the connectors;

Fig. 7 is a perspective view of another type of connector embodying the present invention joining four pipe ends together;

Fig. 8 is a perspective view of still another type of connector embodying the invention joining five pipe ends together;

Fig. 9 is a perspective view of a further form of connector joining six pipe ends together;

Fig. 10 is a plan view of the construction shown in Fig. 9;

Fig. 11 is a cross-sectional view, taken on the line 11—11 of Fig. 10, and

Fig. 12 is a perspective view of one part of the anchoring member employed in the connector.

Referring to the drawings, and more particularly to Fig. 1 thereof, there is shown a rack or stand 1 constructed from a number of preferably unthreaded pipe sections connected together by pipe connectors embodying the present invention. The various types of pipe connectors shown in Fig. 1, while differing somewhat in structure, depending upon their location in the rack, all comprise two clamping members or halves for clamping the ends of pipe sections therebetween with at least one of the clamping members having a seat on the outer side thereof for receiving the end of an anchor pipe thereagainst, together with clamping means which clamp the two halves together and also hold the end of the anchor pipe tightly against the seat provided therefor on the adjacent clamping member.

Referring to Figs. 2 to 5, there is shown a pipe connector 11 intended for use in a corner construction of the rack shown in Fig. 1. It comprises a pair of cooperating clamping members 12 and 13 which are substantially V-shaped in elevation, as shown in Fig. 3, with the ends channel-shaped and substantially semicircular, for engaging opposite sides of the pipe ends 2 to be clamped therebetween. The clamping member 13 is provided with a seat, such as an annular groove 14 in the face thereof, which receives the end of an anchor pipe 15, the latter usually extending substantially normal to the pipes clamped between the channel-shaped ends of the clamping members 12 and 13. However, the angle between the anchor pipe and the other pipes may vary as desired and the seat on the clamping member 13 will be arranged accordingly.

The channel-shaped ends of the clamping members 12 and 13 are provided with transversely or circumferentially arranged internal recesses 16. Clamping inserts 17, which are substantially V-shaped in cross section, as shown in Fig. 6, with the free edges concavely rounded so as to fit the outer walls of the pipe ends to be clamped, are inserted in the various recesses 16 with their free edges facing inwardly, as illustrated in Figs. 5 and 11. When pressed against the pipe ends the clamping inserts prevent movement of the engaged pipes in either direction.

A single clamping construction may be employed for securing the cooperating clamping members together and simultaneously anchoring the anchor pipe against its clamping member 13. For this purpose an anchor member 18 may be positioned in the adjacent end of the anchor pipe 15. A bolt 19 or other suitable securing member extends from the outer side of the clamping member 12 through openings 20 provided therefor in both clamping members, and into the anchor member 18 in the anchor pipe 15. Tightening the bolt draws the end of the anchor pipe 15, in which the anchor member is positioned, against the clamping member 13 forcing the clamping members 12 and 13 together with the inserts 17 biting into the pipe ends. At the same time the bolt 19, being secured to the anchor member 18, tightly holds the anchor pipe 15 in its seat on the clamping member 13.

The preferred form of clamping means employed in the present invention is shown in Figs. 5, 11, 12 and 13. It comprises an expansion member or nut split longitudinally into two similar parts 21 and 22 and internally threaded. The expansion member may be convex in shape, tapering from the central portion which is of greatest diameter toward both ends. The central threadway tapers from the central portion, where it is of a size to threadedly receive the bolt 19, to a smaller diameter at the outer end, as illustrated in Fig. 13. The inner end of the threadway is flared outwardly to progressively engage the bolt as the bolt passes through the threadway and expands the outer end thereof.

In order to maintain the anchor member 18 in fixed position after the bolt has been inserted, the two halves thereof, 21 and 22, are provided with a circumferential groove 23 on their outer surfaces rearwardly of the central portion thereof in which there is positioned a split ring 24. The split ring slants inwardly toward the adjacent clamping portion and is sufficiently wide that its outer edge projects from the groove 23. When the outer end of the expansion member 18 is expanded by the threading of the bolt therein, the outer edge of the split ring will tightly engage the inner wall of the pipe 15 and hold the anchor member against movement as the bolt is tightened.

When it is desired to secure pipe ends in fixed relation to form a corner of a rack, stand, or other construction, the clamping members 12 and 13 are placed in cooperating position and the bolt 19 is passed therethrough and threaded a slight distance into the anchoring member 18 in the end of an anchor pipe 15. The adjacent ends of the pipes 2 are then inserted between the clamping members in the channels provided therefor with the clamping inserts 17 in the recesses 16. Thereafter, tightening the bolt 19 expands the anchoring member 18 and pulls the anchor pipe 15 against the clamping member 13. This in turn forces the two clamping members tightly together, securing all the ends of the junctioning pipes in desired fixed relation to each other. The clamping member 12 is preferably recessed to receive the head 25 of the bolt 19, which is preferably of the Allen type, having a hexagonal opening therein.

The connecting member 30 shown in Fig. 7 is similar to that shown in Figs. 2 to 5, except that each of the cooperating clamping members 31 and 32 is T-shaped in side elevation with three outwardly projecting channel portions for clamping three pipe ends 33 therebetween in addition to the anchor pipe 34 which engages the seat provided therefor on the clamping portion 32. The clamping construction is the same as in the connecting member 11. Such a connecting member would be used on the outer edges of the rack intermediate the corner connectors 11.

Referring to Fig. 8, there is shown still another connecting member 40 which is similar to the connecting member shown in Fig. 7, except that each of the clamping members 41 and 42 is substantially cross shaped in side elevation to secure four pipe ends in fixed relation in addition to the anchoring pipe 44. The channel portions of the clamping members extend outwardly from the clamping bolt passing therethrough into the anchor member in the anchor pipe 44. In the form of connecting members shown in Figs. 1 through 8, the channels are arranged to hold the pipes 2, 33 and 43 so they extend substantially radially outwardly and normal to each other, with their axes in a common plane, and the anchor pipe extending normal to this plane. However, if desired, the various channel portions need not be formed with their axes lying in a common plane, nor is it necessary that the anchor pipe extend normal to one or more of the pipes secured to the channels of the clamping members.

Referring to Figs. 9, 10 and 11, a modified form of connecting member 50 is employed for holding in fixed relationship the ends of six pipes. The connecting members 50 would be employed on the interior of the rack, as shown in Fig. 1. Each of the connecting members 50 comprises two similar clamping members 51 and 52, each having cooperating channel portions for clamping four pipes 53 therein and a seat 54 on the outer face thereof for receiving the end of an anchor pipe 55.

A bolt 56 extends from the inner side of each clamping member 51 and 52 outwardly through the opening 57 and threads into an anchor member 58. These anchor members are similar to the anchor member 18, previously described, and have a circumferential channel 59 in which a split ring 61 seats. In order to fixedly hold the ends of the pipes 53 in the channels provided therefor, the channel members are formed with circumferential recesses 62, in each of which a clamping member 63, like that shown in Fig. 6, is positioned.

The two clamping members 51 and 52 are held together by screws 64 passing through openings 65 in the corner web portions 66 located between adjacent channel portions. Nuts 67 are threaded on the end of the screws 64 to hold the members tightly together.

In using a connecting member of the type shown in Figs. 9, 10 and 11, the clamping members 51 and 52 are first secured to the ends of their respective anchor pipes 55 by threading the bolts 56 into the anchor members 58. The two clamping members are then arranged in cooperating position with the ends of the pipes 53 positioned in the channels provided therefor. Thereafter the screws 64 are positioned in the opening 65 and the nuts 67 are threaded onto the ends thereof and tightened. In this way the six junctioning pipe ends 53 and 55 are fixedly secured in position.

When it is desired to secure a pipe end to a wall or structure other than another pipe end, a construction similar to the clamping members 51 or 52 may be employed. However, after the pipe end, which serves as the anchor pipe, is secured to a clamping member, the clamping member is positioned by any suitable means to the structure intended to support the pipe end. In such use the clamping member need not have any channel portions, but may be formed with its inner side flat so that it may be more readily mounted on a flat surface.

With the present invention innumerable racks, stands and other constructions may be readily formed from unthreaded pipe sections and a few types of connectors with a minimum of time, labor and expense. The resulting structure will be strong and also permanent until such time as it is desired to disassemble it.

While particular embodiments of this invention have been illustrated and described, it will be understood, of course, that the invention is not to be limited thereto, since many modifications may be made, and it is contemplated, therefore, by the appended claims, to cover any such modifications as fall within the true spirit and scope of this invention.

I claim:

1. A pipe connector comprising a pair of pipe clamping members having cooperative channel portions for receiving the ends of pipes therebetween, one of said clamping members having on the outer side thereof a seat portion for receiving the end of an anchoring pipe thereagainst, split expansible anchoring means movable toward and away from said last mentioned clamping member and separate from said clamping members for being positioned in said anchoring pipe, said anchoring means having a longitudinally extending opening therethrough gradually decreasing in size toward the outer end thereof, and a fastener member extending through said clamping member for engagement with said anchoring means to expand the outer portion of said anchoring means into engagement with the pipe walls thereabout, said fastener member being limited in movement toward said anchoring means and being adjustable with respect to said anchoring means to force the ends of said anchoring pipe against its seat and the clamping members substantially together about the ends of said other pipes.

2. A pipe connector comprising a pair of cooperating pipe clamping members having cooperating channel portions for receiving the ends of pipes therebetween, said channel portions having recesses in the inner sides thereof, one of said clamping members having on the outer side thereof a seat portion for receiving the end of an anchoring pipe thereagainst, anchoring means movable toward and away from said last mentioned clamping member and separate from said clamping members for being positioned in said anchoring pipe and engaging the inner walls thereof, a fastener member extending through said clamping member for engagement with said anchoring means, said fastener member being limited in movement toward said anchoring means and being adjustable to force the ends of said anchoring pipe against its seat and the clamping members substantially together about the ends of said other pipes, and locking inserts in the channel portion recesses for engaging the pipe ends to fixedly hold them in said channel portion.

3. A pipe connector comprising a pair of cooperating pipe clamping members having cooperating channel portions for receiving the ends of pipes therebetween, said channel portions having transversely arranged recesses in the inner sides thereof, one of said clamping members having on the outer side thereof a seat portion for receiving the end of an anchoring pipe thereagainst, anchoring means movable toward and away from said last mentioned clamping member and separate from said clamping members for being positioned in said anchoring pipe, a fastener member extending through said clamping member for engagement with said anchoring means, said fastener member being limited in movement toward said anchoring means and being adjustable to force the ends of said anchoring pipe against its seat and the clamping members substantially together about the ends of said other pipes, and locking inserts substantially channel shaped in cross section, positioned in said recess with the free edges projecting inwardly for engaging the pipe ends to fixedly hold them in said channel portions.

4. A pipe connector comprising a pair of cooperating pipe clamping members having cooperating channel portions for receiving the ends of pipes therebetween, each of said clamping members having on the outer side thereof a seat portion for receiving the end of an anchoring pipe thereagainst, anchoring means for being positioned in said anchoring pipes, a fastener member extending through each of said clamping members for engagement with the anchoring means adjacent thereto to force the ends of said anchoring pipes against their seats, and means for fastening the clamping members together.

5. A pipe connector comprising a pair of cooperating pipe clamping members having a plurality of substantially radially extending cooperating channel portions for receiving the ends of pipes therebetween, each of said clamping members having on the outer side thereof a seat portion for receiving the end of an anchoring pipe thereagainst, anchoring means for being positioned in said anchoring pipes, a fastener member extending through each of said clamping members for engagement with the anchoring means adjacent thereto to force the ends of said anchoring pipes against their seats, and means associated with each of said clamping members intermediate said channel portions for fastening said clamping members together.

6. A pipe connector comprising a pair of cooperating pipe clamping members having cooperating channel portions for receiving the ends of pipes therebetween, one of said clamping members having on the outer side thereof a seat portion for receiving the end of an anchoring pipe thereagainst, anchoring means movable toward and away from said last mentioned clamping member and separate from said clamping members for being positioned in said anchoring pipe and engaging the inner walls thereof, and a fastener member extending through said clamping members and engaging said anchoring means, said fastener member being limited in movement toward said anchoring means and being adjustable to urge said anchoring means toward said clamping members to force the end of said anchoring pipe against its seat and the clamping members toward each other about the ends of said other pipes.

7. A pipe connector comprising a pair of cooperating pipe clamping members having cooperating channel portions for receiving the ends of pipes therebetween, one of said clamping members having on the outer side thereof a seat portion for receiving the end of an anchoring pipe thereagainst, internally threaded anchoring means movable toward and away from said last mentioned clamping member and separate from said clamping members for being positioned in said anchoring pipe and engaging the inner walls thereof, and an externally threaded fastener member extending through said clamping members and threadedly engaging said anchoring means, said fastener member being limited in movement toward said anchoring means and being adjustable to urge said anchoring means toward said clamping members to force the end of said anchoring pipe against its seat and the clamping members toward each other about the ends of said other pipes.

8. A pipe connector comprising a pair of cooperating pipe clamping members having cooperating channel portions for receiving the ends of pipes therebetween, one of said clamping members having on the outer side thereof a seat portion for receiving the end of an anchoring pipe thereagainst, anchoring means movable toward and away from said last mentioned clamping member and separate from said clamping members for being positioned in said anchoring pipe, said anchoring means being expansible to fixedly engage the pipe walls thereabout upon expansion thereof, and a fastener member extending through said clamping members and engaging said anchoring means, said fastener member being limited in movement toward said anchoring means and being adjustable to expand and urge said anchoring means toward said clamping members to force the end of said anchoring pipe against its seat and the clamping members toward each other about the ends of said other pipes.

9. A pipe connector comprising a pair of cooperating pipe clamping members having a plurality of substantially radially extending cooperating channel portions for receiving the ends of pipes therebetween, one of said clamping members having on the outer side thereof a seat portion for receiving the end of an anchoring pipe thereagainst, anchoring means movable toward and away from said last mentioned clamping member and separate from said clamping members for being positioned in said anchoring pipe and engaging the inner walls thereof, and a fastener member extending through said clamping members and engaging said anchoring means, said fastener member being limited in movement toward said anchoring means and being adjustable to urge said anchoring means toward said clamping members to force the end of said anchoring pipe against its seat and the clamping members toward each other about the ends of said other pipes.

10. A pipe connector comprising a pipe end mounting member having on the outer side thereof a seat portion for receiving the end of an anchoring pipe thereagainst, means for securing said pipe to said mounting member comprising anchoring means movable toward and away from said member and separate therefrom for being positioned in said anchoring pipe and engaging the inner walls thereof, and a fastener member on said mounting member limited in movement toward said anchoring means, said fastener member being adjustable to urge said anchoring means toward said mounting member to force the end of said anchoring pipe against its seat.

11. A pipe connector comprising a pipe end mounting member having on the outer side thereof a seat portion for receiving the end of an anchoring pipe thereagainst, means for securing said pipe to said mounting member comprising anchoring means movable toward and away from said member and separate therefrom for being positioned in said anchoring pipe, said anchoring means being expansible to fixedly engage the pipe walls thereabout upon expansion thereof, and a fastener member on said mounting member limited in movement toward said anchoring means, said fastener member being adjustable to expand and urge said anchoring means toward said mounting member to force the ends of said anchoring pipe against its seat.

References Cited in the file of this patent

UNITED STATES PATENTS

| | | |
|---|---|---|
| 961,981 | Miller | June 21, 1910 |
| 1,083,697 | Neptune | Jan. 6, 1914 |
| 1,871,668 | Dawson | Aug. 16, 1932 |
| 2,212,455 | Reed | Aug. 21, 1940 |
| 2,224,515 | Karsikas | Dec. 10, 1940 |
| 2,259,269 | Ruth | Oct. 14, 1941 |
| 2,370,725 | Gordon | Mar. 6, 1945 |
| 2,609,638 | Lindenmeyer | Sept. 9, 1952 |

FOREIGN PATENTS

| | | |
|---|---|---|
| 677,108 | Great Britain | Aug. 6, 1952 |